UNITED STATES PATENT OFFICE.

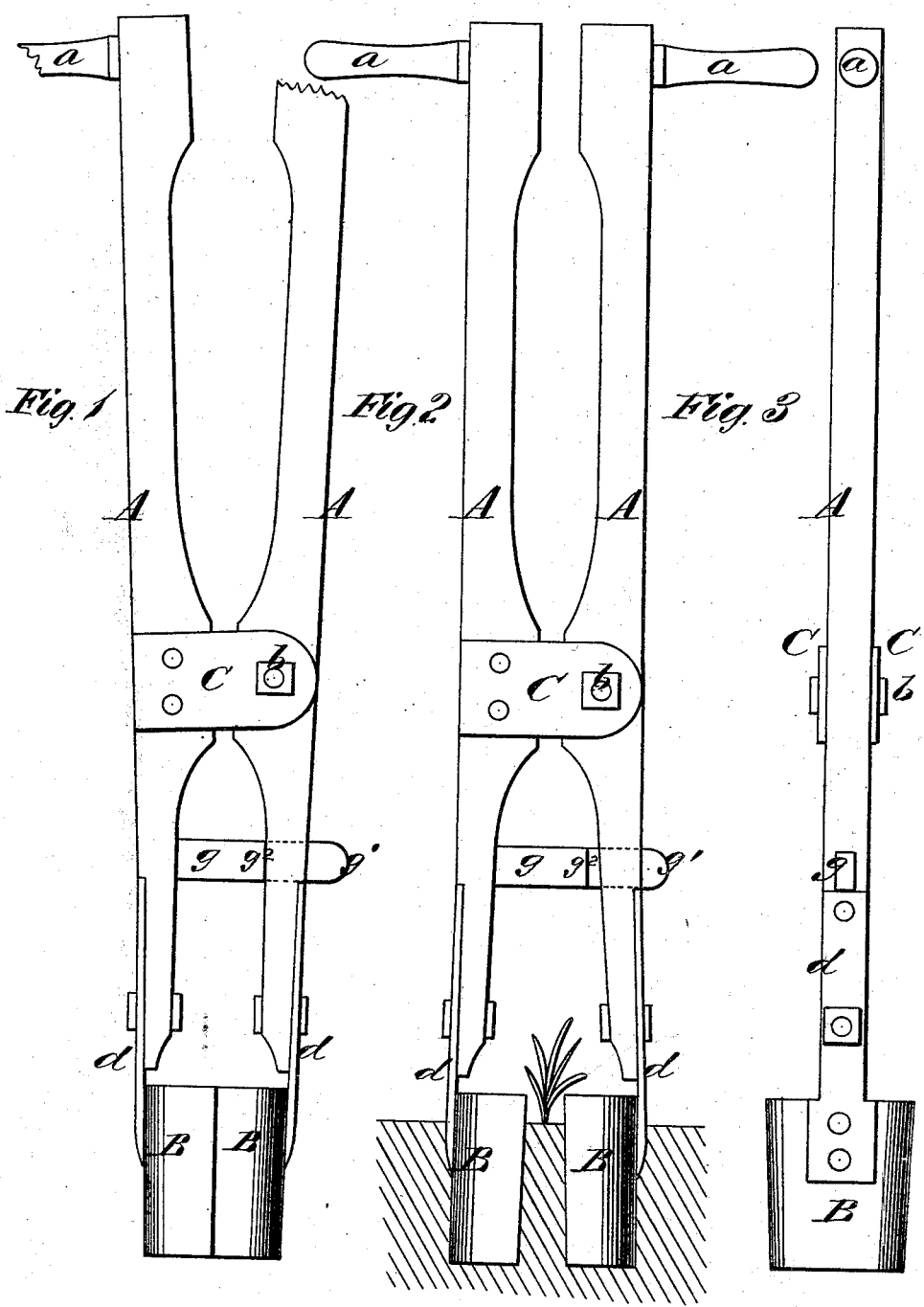

WILLIAM E. JOHNSON AND JOHN C. BOWMAN, OF PICKENS STATION, MISSISSIPPI.

IMPROVEMENT IN TRANSPLANTERS.

Specification forming part of Letters Patent No. 169,445, dated November 2, 1875; application filed April 24, 1875.

*To all whom it may concern:*

Be it known that we, WILLIAM E. JOHNSON and JOHN C. BOWMAN, both of Pickens Station, in the county of Holmes and State of Mississippi, have invented a new and valuable Improvement in Transplanters; and I do hereby declare that the following is a full, clear, and exact description of the construction and operation of the same, reference being had to the annexed drawings, making a part of this specification, and to the letters and figures of reference marked thereon.

Figures 1, 2, and 3 of the drawings are representations of plan views of our transplanters.

This invention has relation to implements which are used for transplanting young corn and other plants, for the purpose of supplying each hill with its quota of plants; and the nature of my invention consists in the employment, on the ends of two levers, of two semicircular metallic spades, which, when brought together, form a cup for compressing the earth about the roots of a plant, and allowing the plant to be removed and transplanted, in combination with one or more stops for checking the spades when they are properly brought together, and preventing injury to the plant, as will be hereinafter explained.

In the annexed drawings, A A designate two levers, which are provided, near their upper ends, with handles $a\ a$, and which are connected together by plates C C, and a pivot, $b$, located near their lower ends. B B designate two semi-cylindrical blades or spades, which are made of sheet metal, with narrow shanks $d\ d$ riveted to them, by means of which and screws or bolts the spades are rigidly secured to the lower ends of the levers A A. Between the spades and the pivot $b$ is a stop, $g$, which is a short bar having a tenon, $g^1$, on one end, which plays freely through a mortise in one of the levers. The shoulder $g^2$ is at such a distance from the lever to which the stop is secured that it will abut against the opposite lever when the straight edges of the spades are brought together, and prevent the spades from lapping and injuring a plant or being injured themselves.

In practice we shall apply a spring between the longer arms of the levers.

To use the implement, the spades are separated, as shown in Fig. 2, and plunged into the ground on opposite sides of the plant. They are then pressed together, forming a cylindrical cup, between which the plant is confined, with a quantity of earth compacted about its roots. The instrument is then withdrawn from the earth, and the plant is transplanted wherever desired.

What we claim as new, and desire to secure by Letters Patent, is—

In a transplanter, the semicircular shovels B B, rigidly secured to the short arms of two pivoted levers, A A, having handles $a\ a$, in combination with a stop, $g$, as shown and described.

In testimony that we claim the above we have hereunto subscribed our names in the presence of two witnesses.

WILLIAM EZRA JOHNSON.
JOHN CALHOUN BOWMAN.

Witnesses:
A. J. GURCE,
R. E. WILBUR.